United States Patent [19] [11] 4,140,680

Sullivan [45] Feb. 20, 1979

[54] 2-ACRYLAMIDO-2-METHYLPROPANE SULFONIC ACID VINYL AMINIMIDE/COPOLYMER

[75] Inventor: Charles I. Sullivan, Melrose, Mass.

[73] Assignee: Polaroid Corporation, Cambridge, Mass.

[21] Appl. No.: 753,522

[22] Filed: Dec. 22, 1976

[51] Int. Cl.[2] .......................... C08F 228/02

[52] U.S. Cl. .......................... 526/287; 96/94 R

[58] Field of Search .............. 260/79.3 MU; 526/307

[56] References Cited

U.S. PATENT DOCUMENTS

| | | | |
|---|---|---|---|
| 3,506,707 | 4/1970 | Miller | 260/79.3 MU |
| 3,664,990 | 5/1972 | Slagel | 526/307 |
| 3,756,994 | 9/1973 | Culbertson | 526/307 X |
| 3,770,708 | 11/1973 | Knoepfel | 260/79.3 MU |

*Primary Examiner*—C. A. Henderson
*Attorney, Agent, or Firm*—Philip G. Kiely

[57] ABSTRACT

As a novel composition of matter, a copolymer of 2-acrylamido-2-methylpropane sulfonic acid and a vinyl aminimide.

4 Claims, No Drawings

2-ACRYLAMIDO-2-METHYLPROPANE SULFONIC ACID VINYL AMINIMIDE/COPOLYMER

BACKGROUND OF THE INVENTION

The monomer 2-acrylamido-2-methylpropane sulfonic acid is known to the art and is commercially available.

A class of monomers characterized as vinyl aminimides are also known to the art. Such aminimide monomers are disclosed, for example, in U.S. Pat. Nos. 3,527,892 and 3,641,145. Reference should also be made to copending application Ser. No. 753,521, filed Dec. 22, 1976 in the names of Avinash C. Mehta, Donald O. Rickter and Lloyd D. Taylor, commonly assigned which discloses monomers of the formula:

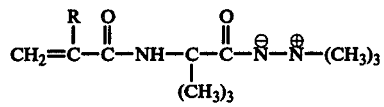

wherein R is hydrogen or a lower alkyl.

The aminimide group may be represented by the formula:

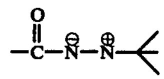

A novel class of copolymers of 2-acylamido-2-methylpropane sulfonic acid and a vinyl aminimide has now been found.

SUMMARY OF THE INVENTION

The novel compositions of the present invention comprise copolymers of 2-acrylamido-2-methylpropane sulfonic acid and vinyl aminimides and possess surfactant and suspending properties and relatively high electrical conductivity. The property of conductivity makes the novel copolymers of the present invention particularly suitable for use in the products and processes disclosed and claimed in copending application Ser. No. 672,647, filed Apr. 1, 1976 in the names of Arthur M. Gerber and Vivian Walworth, now U.S. Pat. No. 4,060,419, issued Nov. 29, 1977, and commonly assigned.

DETAILED DESCRIPTION OF THE INVENTION

The novel copolymers of the present invention are prepared by conventional vinyl polymerization techniques such as free radical polymerization techniques. Although the monomers may be combined in substantially any ratio, if relatively high conductivity is desired it is preferred to employ at least 50% by weight of 2-acrylamido-2-methylpropane sulfonic acid. In a particularly preferred embodiment, at least 80% by weight is employed.

The following non-limiting examples illustrate the preparation of the novel copolymers of the present invention.

EXAMPLE 1

The following materials were placed in a glass vessel:

| Material | Amount |
|---|---|
| 2-acrylamido-2-methylpropane sulfonic acid | 17.4 g. |
| $CH_2=CH-C(=O)-\overset{\ominus}{N}-\overset{\oplus}{N}-(CH_3)_3$: Trimethylamine acrylimide | 2.6 g. |
| Water | 108.0 g. |
| Azobisisobutyronitrile | 10 mg. |

The mixture was heated under a blanket of nitrogen at 65° C. for 30 hours. An aqueous viscous solution of the copolymer was obtained.

EXAMPLE 2

The following materials were placed in a glass vessel:

| Material | Amount |
|---|---|
| 2-acrylamido-2-methylpropane sulfonic acid | 16.0 g. |
| $CH_2=CH-C(=O)-C(CH_3)_2-C(=O)-\overset{\ominus}{N}-\overset{\oplus}{N}-(CH_3)_3$ Trimethylamine N-acryloyl-methylalaninimide | 4.0 g. |
| Water | 108.0 g. |
| Azobisisobutyronitrile | 10 mg. |

The mixture was heated under a blanket of nitrogen for 3 days at 65° C. An aqueous solution of the copolymer was obtained having a viscosity of about 5000 cps (Brookfield No. 4 spindle, 60 rpm at 25° C.).

The novel copolymers of the present invention possess unusual salt stability while retaining their viscosity. This property makes the copolymers particularly suitable for use in the procedures set forth in the above-mentioned application Ser. No. 672,647.

What is claimed is:

1. A copolymer of 2-acrylamido-2-methylpropane sulfonic acid and a vinyl aminimide wherein said vinyl aminimide consists of at least about 10% by weight of said copolymer.

2. The composition of claim 1 wherein said vinyl aminimide is trimethylamine acrylimide.

3. The composition of claim 1 wherein said vinyl aminimide is trimethylamine N-acryloyl-methylalaninimide.

4. The composition of claim 2 wherein said vinyl aminimide consists of about 20 by weight of said copolymer.

* * * * *